(12) United States Patent
Thompson (10) Patent No.: US 10,486,578 B2
(45) Date of Patent: Nov. 26, 2019

(54) OVERHEAD LIFT ASSIST SYSTEM

(71) Applicant: John Nathan Thompson, Louisville, KY (US)

(72) Inventor: John Nathan Thompson, Louisville, KY (US)

(73) Assignee: John Nathan Thompson, Louisville, KY (US)

( * ) Notice: Subject to any disclaimer, the term of this patent is extended or adjusted under 35 U.S.C. 154(b) by 0 days.

(21) Appl. No.: 15/286,667

(22) Filed: Oct. 6, 2016

(65) Prior Publication Data

US 2017/0096090 A1 Apr. 6, 2017

Related U.S. Application Data

(60) Provisional application No. 62/238,026, filed on Oct. 6, 2015.

(51) Int. Cl.
*B66D 1/28* (2006.01)
*B60R 9/04* (2006.01)
*B60P 3/00* (2006.01)
*B60P 1/54* (2006.01)

(52) U.S. Cl.
CPC ...... *B60P 1/54* (2013.01); *B60P 3/00* (2013.01); *B60R 9/04* (2013.01); *B66D 1/28* (2013.01)

(58) Field of Classification Search
CPC ...... B60P 1/54; B60P 3/28; B60P 3/41; B60P 3/00; B66C 23/44; A01G 23/006; B60R 9/04; B66D 1/28
See application file for complete search history.

(56) References Cited

U.S. PATENT DOCUMENTS

| | | | |
|---|---|---|---|
| 3,508,676 A * | 4/1970 | Peterson | A01G 23/006 414/704 |
| 3,517,839 A * | 6/1970 | Jorgensen | B60P 3/41 414/559 |
| 3,788,605 A | 1/1974 | Johnson | |
| 3,876,183 A | 4/1975 | Strout et al. | |
| 3,927,779 A | 12/1975 | Johnson | |
| 3,976,210 A * | 8/1976 | Allen | B60P 3/41 414/559 |
| 4,127,295 A | 11/1978 | Robinson | |
| 4,382,736 A | 5/1983 | Thomas | |

(Continued)

FOREIGN PATENT DOCUMENTS

DE 4304021 A1 8/1994

OTHER PUBLICATIONS

International Search Report and Written Opinion dated Jan. 23, 2017 for Application No. PCT/US2016/055647, 13 pgs.

*Primary Examiner* — Saul Rodriguez
*Assistant Examiner* — Ashley K Romano (57) ABSTRACT

An overhead lift assist system enables cargo to be loaded on a utility terrain vehicle and includes a frame, a plurality of rollers, and a cable. The frame is couplable above a cab of the utility terrain vehicle and includes a plurality of rollers disposed along a longitudinal axis. The cable includes a first end positioned at a front portion of the utility terrain vehicle and a second end terminating in a loading connector. The cable has a length great enough to extend past a rear portion of the utility terrain vehicle. A winch is operable to selectively retract the cable to load cargo on the utility terrain vehicle.

18 Claims, 10 Drawing Sheets

(56) References Cited

U.S. PATENT DOCUMENTS

| | | | |
|---|---|---|---|
| 4,400,132 A * | 8/1983 | Deline | A01G 23/006 254/327 |
| 5,072,962 A | 12/1991 | Webb | |
| 5,232,329 A * | 8/1993 | Livingston | B60P 1/54 414/462 |
| 5,393,194 A * | 2/1995 | Smith | B60P 1/00 212/298 |
| 5,485,690 A | 1/1996 | MacQueen | |
| 5,663,541 A | 9/1997 | McGregor, II | |
| 5,904,463 A | 5/1999 | Christensen | |
| 6,138,992 A | 10/2000 | Bell | |
| 6,290,271 B1 | 9/2001 | Geisler | |
| 6,425,596 B1 | 7/2002 | Foers | |
| 6,460,907 B2 | 10/2002 | Usui | |
| 6,609,481 B1 * | 8/2003 | McCarty | A01K 15/00 119/512 |
| 6,631,886 B1 | 10/2003 | Caudle et al. | |
| 6,634,588 B1 | 10/2003 | Jackson | |
| 6,681,507 B1 | 1/2004 | Lieziert | |
| 6,749,267 B1 | 6/2004 | Brooks et al. | |
| 6,981,695 B1 | 1/2006 | Hedlund et al. | |
| 7,849,614 B2 | 12/2010 | Belzile et al. | |
| 7,896,604 B1 | 3/2011 | Bernard et al. | |
| 8,276,884 B2 | 10/2012 | Rusiniak | |
| 8,444,361 B1 * | 5/2013 | Hershey | A01G 23/006 254/324 |
| 8,602,394 B2 | 12/2013 | Christiansen | |
| 8,820,718 B2 | 9/2014 | Weidner | |
| 8,973,693 B2 | 3/2015 | Kinsman et al. | |
| 9,248,999 B2 | 2/2016 | Xydias | |
| 9,388,025 B2 | 7/2016 | Costa | |
| 10,005,647 B2 * | 6/2018 | Anderson | B66D 1/36 |
| 2005/0279977 A1 | 12/2005 | Kerry | |
| 2006/0280584 A1 * | 12/2006 | Spuzak | B66C 23/44 414/462 |
| 2008/0164448 A1 | 7/2008 | Duvall | |
| 2009/0146119 A1 | 6/2009 | Bailey et al. | |
| 2011/0006553 A1 | 1/2011 | Fretz et al. | |
| 2015/0272016 A1 * | 10/2015 | Dixon | B60P 3/41 414/23 |

* cited by examiner

FIG. 13

OVERHEAD LIFT ASSIST SYSTEM

PRIORITY

This application claims benefit to U.S. Provisional Patent Application Ser. No. 62/238,026, entitled "Overhead Lift Assist system for UTV (utility terrain vehicle) is a product that will help lift cargo into the bed of the UTV," filed on Oct. 6, 2015, the contents of which are incorporated by reference herein.

BACKGROUND

A utility terrain vehicle ("UTV") is a small off-road vehicle that is typically used to carry equipment or other cargo. UTVs generally have a high payload capability, which may allow the vehicles to carry about 1,000 pounds of cargo. Because of the high payload capability, it can be difficult for one person to load and/or unload cargo from the UTV. In particular, it can be difficult for an older or disabled user to load and/or unload cargo, or it can be difficult to load and/or unload unwieldy cargo. There are also safety concerns to prevent a user from being injured by loading and/or unloading such heavy cargo. Thus, there remains a need for a system to more easily and safely load and/or unload cargo from a UTV.

SUMMARY

An overhead lift assist system is disclosed that may be used to more easily and safely lift cargo onto a UTV. For instance, the overhead lift assist system enables a person to load large amounts of weight into the bed of a UTV by means of a winch attached to the front of the vehicle and a cable which extends over the top of the vehicle's cab and terminates in a hook that can be connected to an item to be loaded into the bed.

These and other embodiments of the overhead lift assist system are set forth in greater detail below.

BRIEF DESCRIPTION OF THE DRAWINGS

It is believed that the present invention will be better understood from the following description of certain examples taken in conjunction with the accompanying drawings, in which like reference numerals identify like elements.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects of the present disclosure, and together with the descriptions serve to explain the principles and concepts of the present disclosure; it being understood, however, that the present disclosure is not limited to the precise arrangements shown.

DETAILED DESCRIPTION

The following description and embodiments of the present disclosure should not be used to limit the scope of the present disclosure. Other examples, features, aspects, embodiments, and advantages of the present disclosure will become apparent to those skilled in the art from the following description. As will be realized, the present disclosure may contemplate alternate embodiments than those exemplary embodiments specifically discussed herein without departing from the scope of the present disclosure. Accordingly, the drawings and descriptions should be regarded as illustrative in nature and not restrictive.

An overhead lift assist system is disclosed that may be used to more easily and safely lift cargo onto any vehicle used to carry a load, such as a UTV. The overhead lift assist system includes an overhead frame, a plurality of rollers, and a cable. The frame is couplable above a cab of the utility terrain vehicle and the plurality of rollers is disposed along a longitudinal axis. The cable includes a first end attached to the winch and a second end terminating in a loading connector. The cable has a length great enough to extend past a rear portion of the utility terrain vehicle when the winch is coupled to the front portion of the utility terrain vehicle. The plurality of rollers maintains the cable in a taut position. A winch is couplable to a front portion of the utility terrain vehicle and is operable to selectively retract the cable to load cargo on the utility terrain vehicle.

Figure 1:
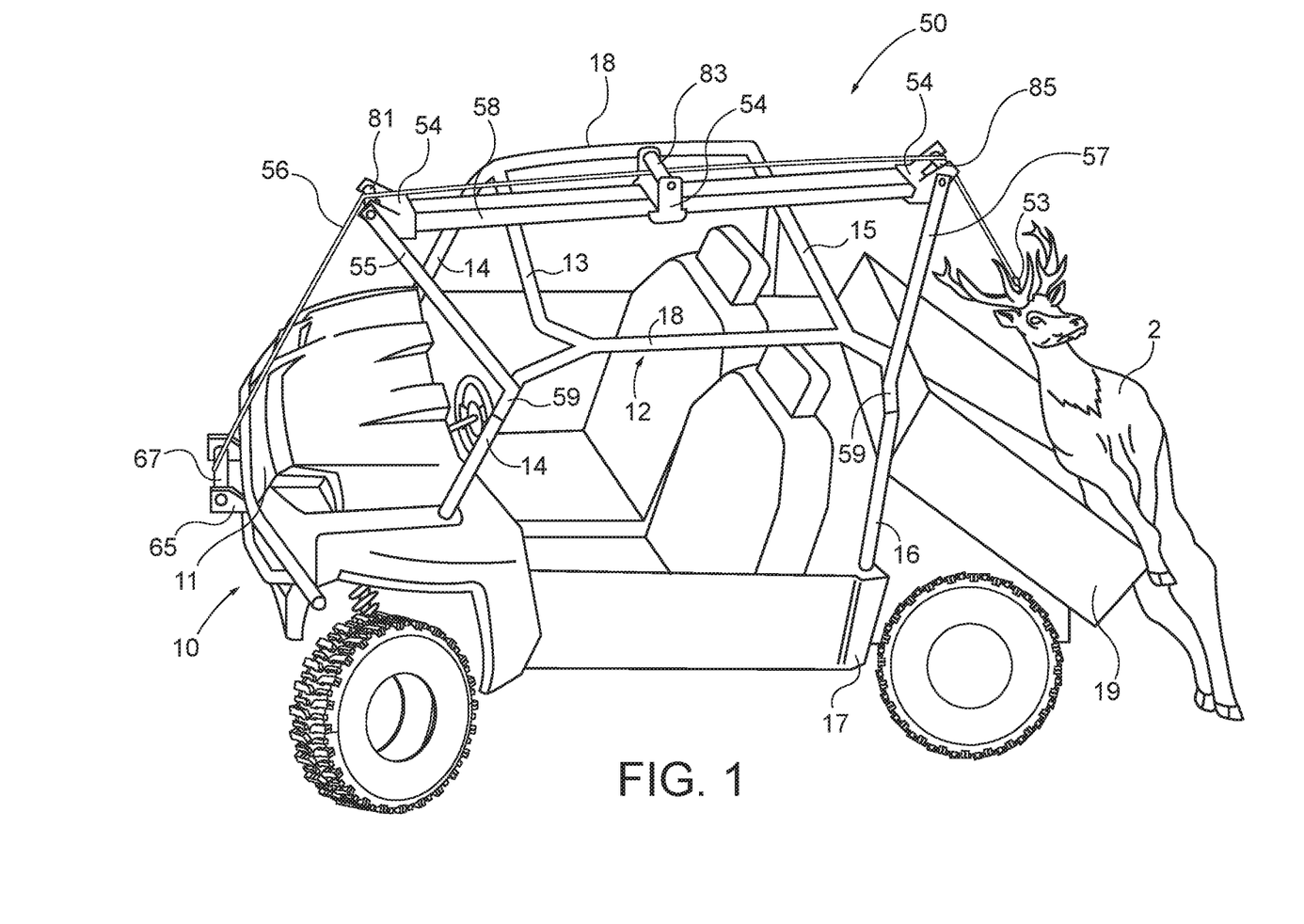
FIG. 1 is a top perspective view of an overhead lift assist system attached to a UTV.

Referring to FIG. 1, an overhead lift assist system (50) is shown attached to a UTV (10). In the illustrated embodiment, the UTV (10) comprises a frame (12) positioned over a cab of the UTV (10). The frame (12) includes a pair of front rails (14) extending upward from a front portion (11) of the UTV (10) and a pair of rear rails (16) extending upward from a rear portion (17) of the UTV (10). The front rails (14) and the rear rails (16) of the frame (12) are connected by a pair of side rails (18) positioned over the cab. A top rail (13) is then positioned transversely across the frame (12) where the front rails (14) are coupled to the side rails (18). Similarly, a rear rail (15) is positioned transversely across the frame (12) where the rear rails (16) are coupled to the side rails (18). Still other suitable configurations for frame (12) will be apparent to one with ordinary skill in the art in view of the teachings herein. The rear portion (17) of the UTV (10) includes a bed (19) that can be used to carry cargo (2), but this is merely optional. For instance, as shown in FIG. 1, the cargo (2) carried by the bed (19) can be a deer, or other type of animal when hunting. Of course, any other suitable type of cargo (2) can be loaded onto UTV (10) such as equipment. While the illustrated embodiment shows the UTV (10) configured to hold two passengers, the UTV (10) can be configured to hold any other suitable number of passengers, such as between two and six passengers. The overhead lift assist system (50) can be adapted to any make and model of UTV (10).

The overhead lift assist system (50) is coupled to the frame (12) of the UTV (10). As shown in FIGS. 1-5, the overhead lift assist system (50) comprises a frame (58), a plurality of rollers (81, 83, 85), and a cable (56). The frame (58) is positioned longitudinally along the UTV (10) above the cab of the UTV (10). While the frame (58) is shown as being centrally positioned along the UTV (10), in some versions, the frame (58) is offset relative to the UTV (10). The frame (58) of the illustrated embodiment also extends from beyond the front of the frame (12) to beyond the rear of the frame (12) of the UTV (10). In some other versions, the frame (58) can be any suitable length relative to the UTV (10) as will be apparent to one with ordinary skill in the art in view of the teachings herein. For instance, while the frame (58) is shown for a two-passenger UTV (10), the frame (58) can be extended for a four and/or a six passenger UTV (10). The frame (58) can be made from rolled steel tubing, or any other suitable type of material. For instance, two pieces of about one inch rolled steel tubing can be welded together to form the frame (58). A front rail (55) extends from the front portion of the frame (58) to a connecting bracket (59) on each side of the frame (58). The connecting brackets (59) are configured to fasten each front rail (55) to a front rail (14) of the UTV (10). A rear rail (57) extends from the rear portion of the frame (58) to a connecting bracket (59) on each side of the frame (58). The connecting brackets (59) are configured to fasten each rear rail (57) to a rear rail (16) of the UTV (10). Connecting brackets (59) can be fastened to the frame (12) using any suitable type of fastener, such as bolts, screws, nails, welds, adhesives, etc. This thereby secures frame (58) of the overhead lift assist system (50) to the frame (12) of the UTV (10). Still other suitable configurations for attaching the frame (58) of the overhead lift assist system (50) to the UTV (10) will be apparent to one with ordinary skill in the art in view of the teachings herein.

Figure 5:
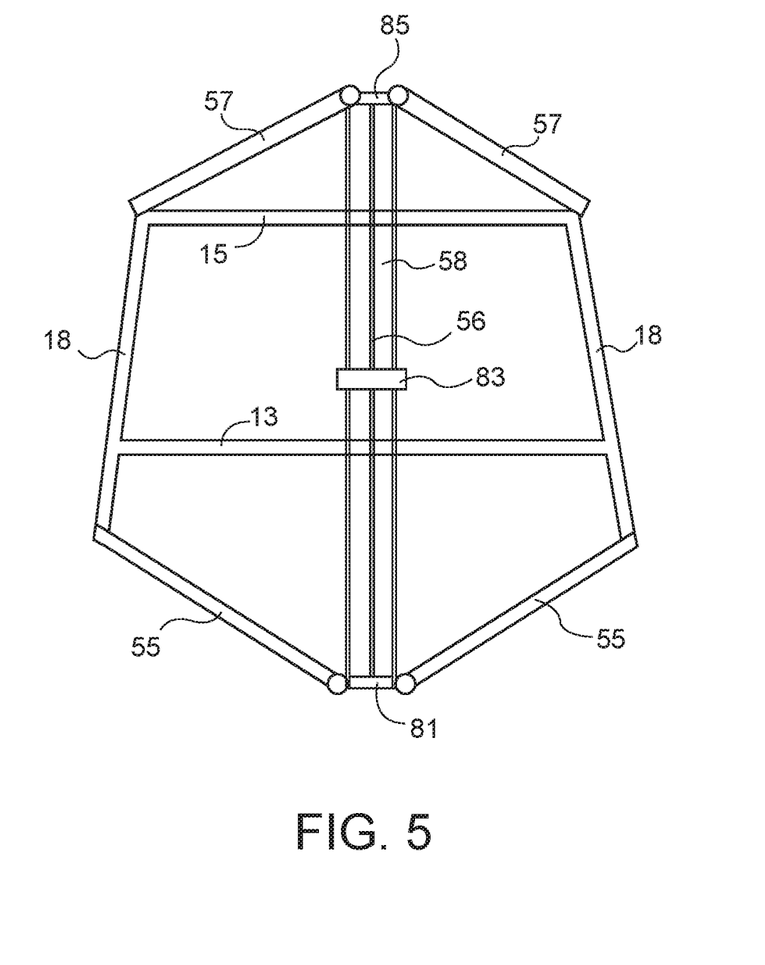
FIG. 5 is a top view of the overhead lift assist system of FIG. 1 shown with the frame of the UTV.

The frame (58) of the overhead lift assist system (50) comprises a plurality of rollers (81, 83, 85) positioned longitudinally along the frame (58). As shown in FIGS. 1 and 5, a front roller (81) is positioned at a front end of the frame (58), a central roller (83) is positioned at a central portion of the frame (58), and a back roller (85) is positioned at a rear end of the frame (58). In some other versions, the rollers (81, 83, 85) are positioned at other positions along the frame (58). Each roller (81, 83, 85) is coupled to the frame (58) by a support (54) such that each roller (81, 83, 85) is configured to rotate relative to each support (54). An additional framing roller (67) is coupled to front portion (11) of the UTV (10) by a support (65) above a winch (51). While four rollers (81, 83, 85, 67) are shown in the illustrated embodiment, any other suitable number of rollers (81, 83, 85, 67) can be used to sufficiently maintain the cable (56) in a taut position away from the UTV (10) such that the cable (56) does not contact the UTV (10). For instance, the front roller (81) is closer longitudinally to the framing roller (67) than the top front portion of the cab of the UTV (10) such that a cable (56) is taut between the framing roller (67) and the front roller (81) such that the cable (56) does not contact the UTV (10) between the front roller (81) and the framing roller (67). The rear roller (85) is farther longitudinally from the framing roller (67) than a top rear portion of the cab of the UTV (10). At least one roller (83) is disposed above a top portion of the cab of the UTV (10) such that the cable (56) extending over the plurality of rollers (81, 83, 85) from the front roller to the back roller would not contact the UTV (10) between the front roller (81) and the back roller (85).

Figure 2:
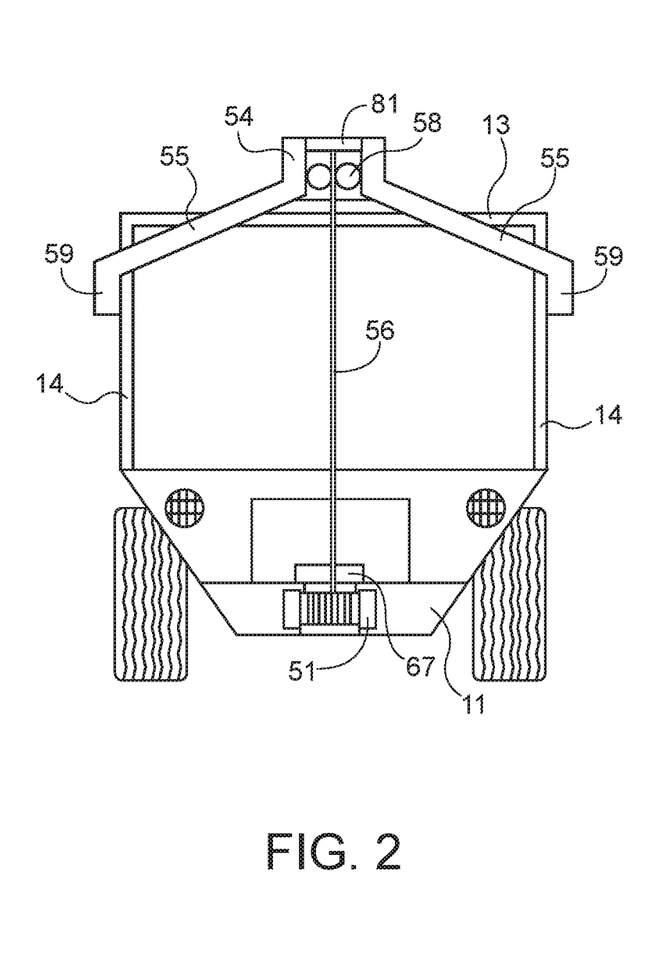
FIG. 2 is a front view of the overhead lift assist system of FIG. 1 attached to the UTV.
Figure 3:
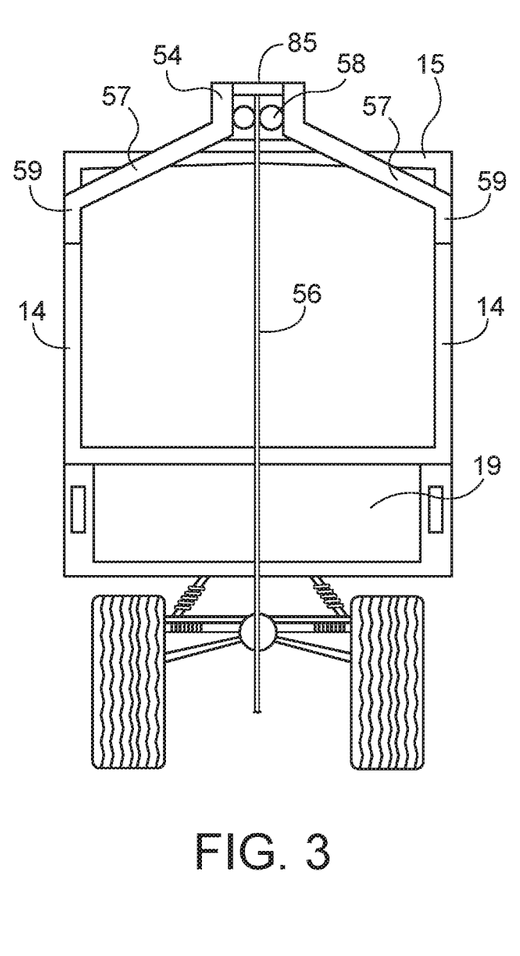
FIG. 3 is a rear view of the overhead lift assist system of FIG. 1 attached to the UTV.
Figure 4A:
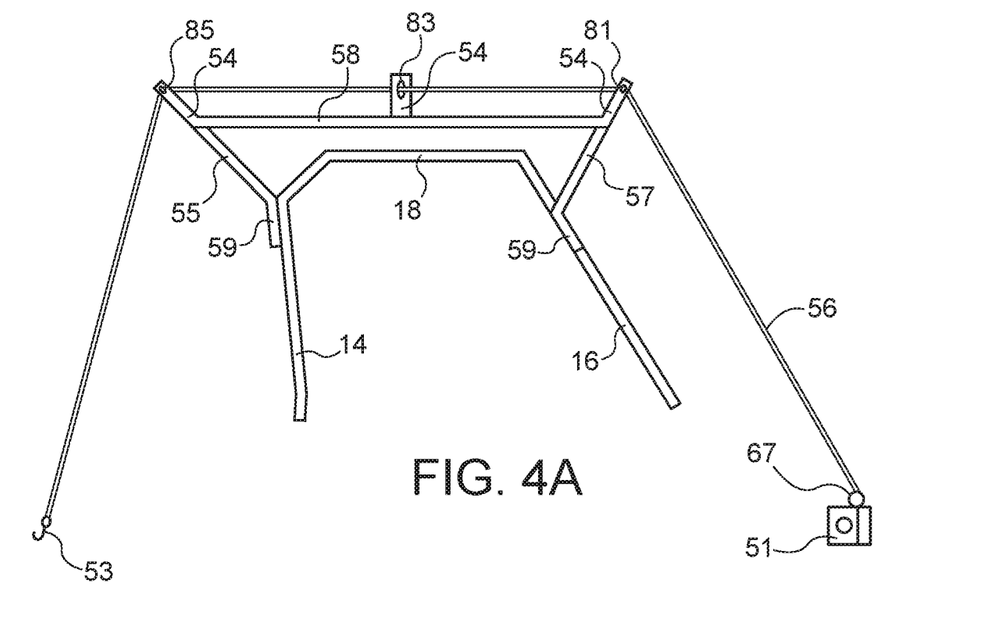
FIG. 4A is a side view of the overhead lift assist system of FIG. 1 in an extended position, shown with a frame of the UTV.
Figure 4B:
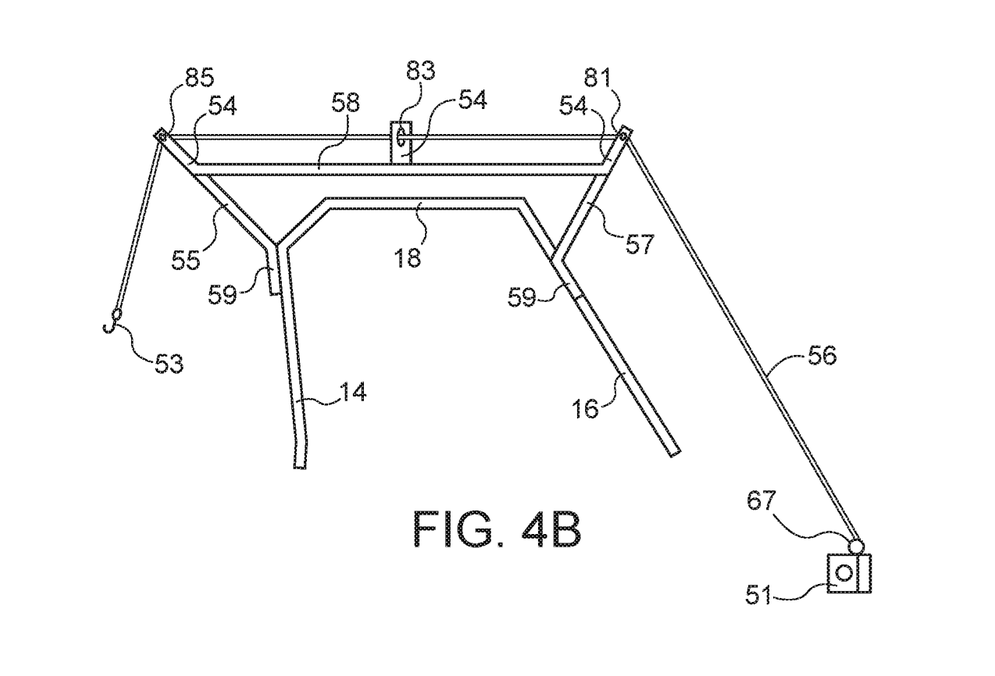
FIG. 4B is a side view of the overhead lift assist system of FIG. 1 in a retracted position, shown with a frame of the UTV.

As best seen in FIGS. 2 and 4, the winch (51) is also coupled to a front portion (11) of the UTV (10). It may be desirable to position the winch (51) to the front portion (11) of the UTV (10) in the event that the UTV (10) becomes stuck. In this case, the winch (51) and cable (56) can be used to pull the UTV (10) back to stable ground. From the winch (51), the cable (56) extends over the plurality of rollers (81, 83, 85, 67) to the rear (17) of the UTV (10). A loading connector (53), such as a hook, a look, or other suitable type of fastener, is coupled to the other end of the cable (56) such that the loading connector (53) is configured to selectively attach cargo (2) to the cable (56). For instance, the loading connector (53) can be directly attached to the cargo (2), or the cable (56) can be wrapped around the cargo (2) such that the loading connector (53) is attached to the cable (56) to attach the cargo (2) to the overhead lift assist system (50). Accordingly, as shown in FIGS. 4A-4B, the winch (51) can be operated to extend and/or retract the cable (56) relative to the winch (51) to thereby load and/or unload cargo (2) on the UTV (10), which will be discussed in more detail below. In some instance, the winch (51) is provided with the overhead lift assist system (50). In some other instances, the winch (51) is provided as a separate component.

Figure 6:
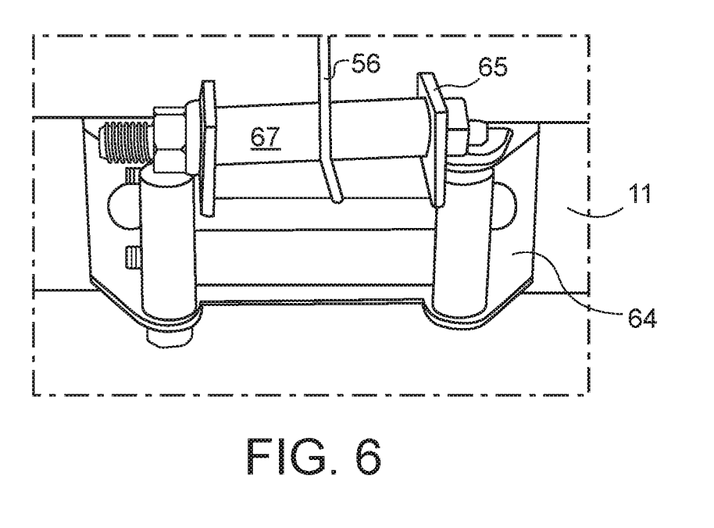
FIG. 6 is a front view of a winch bracket of the overhead lift assist system of FIG. 1 attached to a front portion of the UTV.
Figure 7:
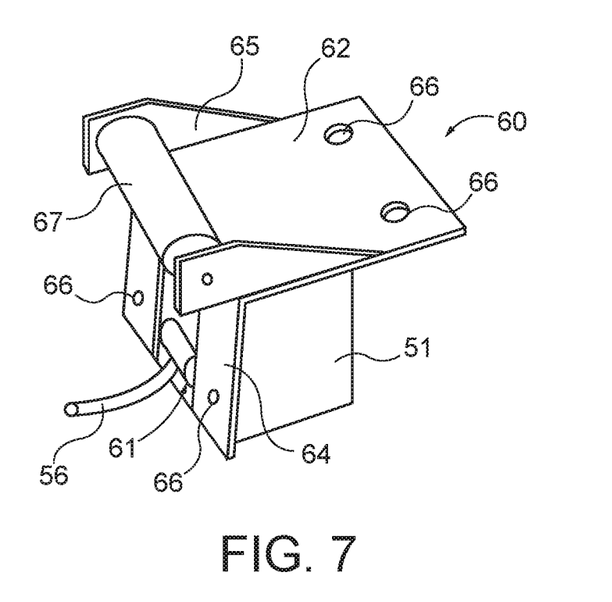
FIG. 7 is a top perspective view of the bracket of FIG. 6.

FIGS. 6-7 show the winch (51) coupled to a front portion (11) of the UTV (10). For instance, a bracket (60) can be used to couple the winch (51) to the front portion (11) of the UTV (10). In the illustrated embodiment, the bracket (60) comprises a top plate (62) and a front plate (64) extending downward from a front portion of the top plate (62). The winch (51) can be positioned underneath the top plate (62) and behind the front plate (64). The front plate (64) includes a recess (64) configured to receive the cable (56) through the recess (64). The bracket (60) comprises a plurality of openings (66) to fasten the bracket (60) to the UTV (10). For instance, the bracket (60) can be fastened to a front bumper and/or hood of the UTV (10) using any suitable fastener, such as bolts, screws, nails, welds, adhesives, etc. The bracket (60) further comprises the support (65) for framing roller (67) above the winch (51). Accordingly, as the cable (56) extends from the winch (51), through the recess (64) of the bracket (60), the cable (56) rests on the roller (67). Still other suitable configurations for coupling the winch (51) to the front portion (11) of the UTV (10) will be apparent to one with ordinary skill in the art in view of the teachings herein.

Accordingly, the overhead lift assist system (50) is configured to more easily and safely lift cargo (2) onto the UTV (10). The winch (51) can be operated to extend the cable (56) relative to the winch (51), as shown in FIG. 4A. This can be performed by a button on the winch (51) or by remote control. With the cable (56) in the extended position, the cable (56) extends from the winch (51), longitudinally over the cab of the UTV (10) along the frame (58) of the overhead lift assist system (50), to the rear portion (17) of the UTV (10). The loading connector (53) can be selectively attached to the cargo (2) in the back of the UTV (10). The winch (51) can then be operated to retract the cable (56) relative to the winch (51), as shown in FIG. 4B. As the cable (56) is retracted, the cable (56) translates along the rollers (81, 83, 85). This may prevent damage to the cable (56) and/or the UTV (10) as the cable (56) is translated. The cable (56)

thereby pulls the cargo (2) upward and toward the rear portion (17) of the UTV (10) to allow the cargo (2) to be loaded into the bed (19) of the UTV (10). The cable (56) can remain tightened, or it can be slightly extended to loosen the cable (56). Accordingly, a single user can operate the overhead lift assist system (10) to load cargo (2) onto the UTV (10).

Figure 8:
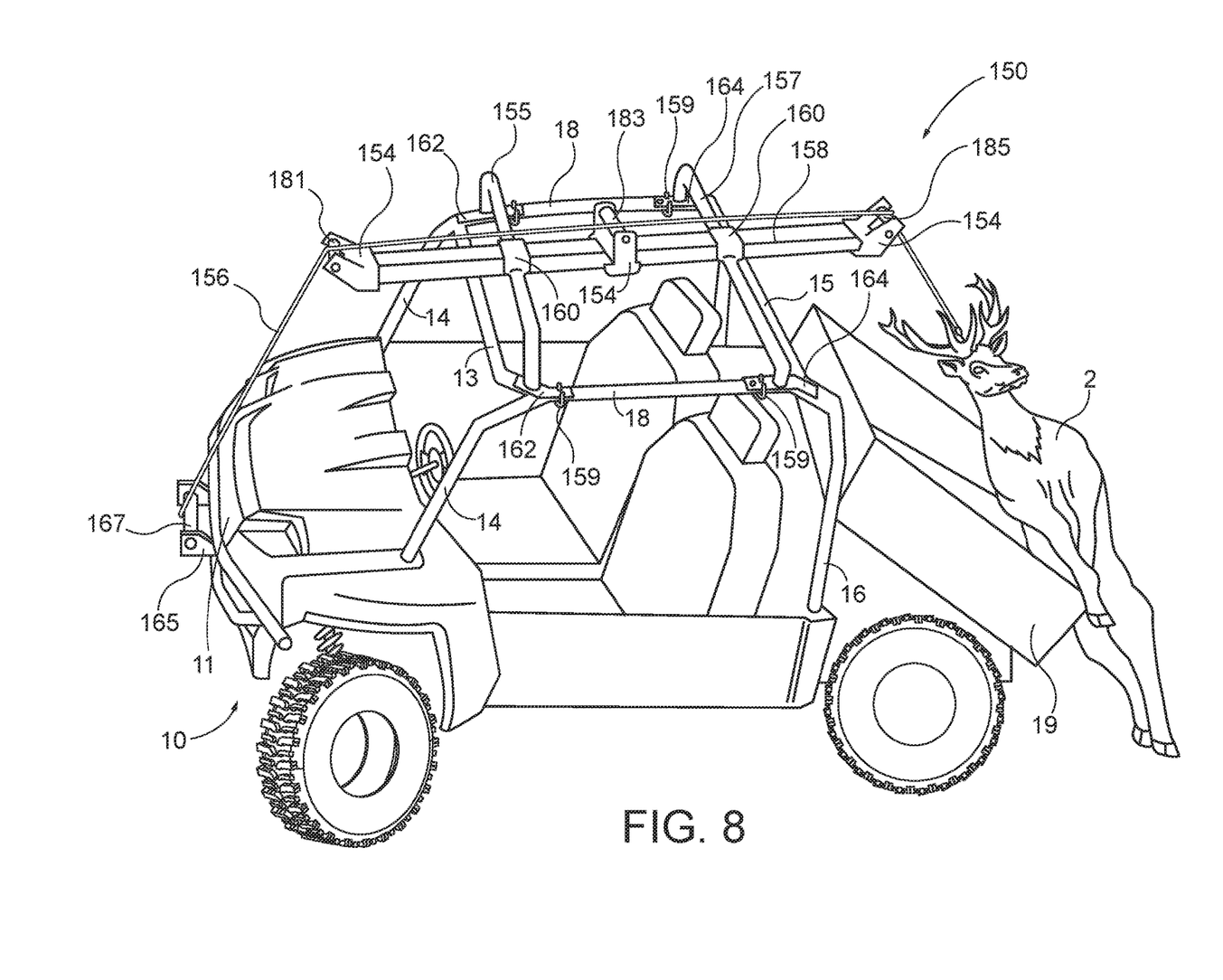
FIG. 8 is a top perspective view of another overhead lift assist system attached to a UTV.

FIG. 8 shows another overhead lift assist system (150) that is similar to overhead lift assist system (50), except that the overhead lift assist system (150) is coupled to a top portion of the frame (12) of the UTV (10) instead of the side portions of the frame (12). This may allow the overhead lift assist system (150) to be coupled to the UTV (10) while still allowing the UTV (10) to accommodate doors and/or windshields. As shown in FIG. 8, the frame (158) of the overhead lift assist system (150) is coupled to the frame (12) of the UTV (10) by a front rail (155) and a rear rail (157). The front rail (155) is configured to extend transversely across the UTV (10) substantially perpendicular to the frame (158). The front rail (155) comprises a support (160) to receive the frame (158) through the support (160). The front rail (155) is coupled to the top portion of the frame (12) of the UTV (10) at the front and side rails (13, 18) by brackets (162).

Figure 10:
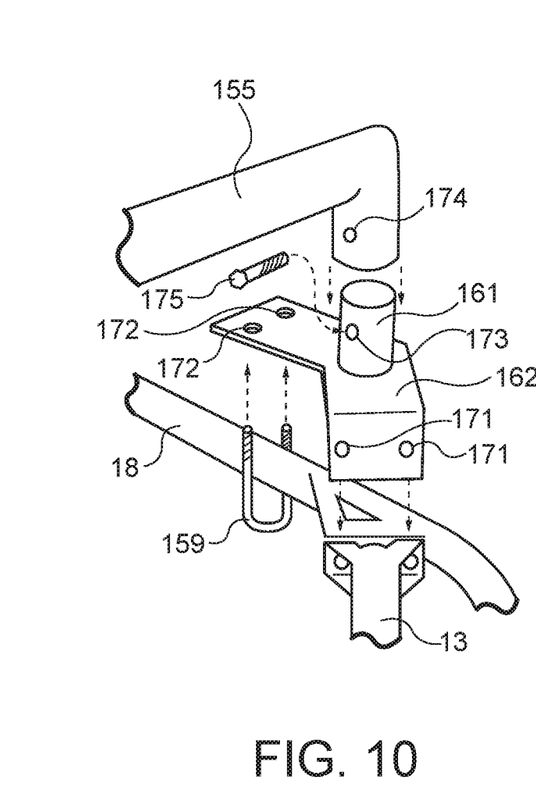
FIG. 10 is an exploded view of a front bracket of the overhead lift assist system of FIG. 8.

Bracket (162) is shown in more detail in FIG. 10. Bracket (162) comprises an angled shape such that a front portion of the bracket (162) overlays front rail (13) and the back portion of the bracket (162) overlays side rail (18). Bracket (162) further comprises a protrusion (161) extending upward from the bracket (162) such that the protrusion (161) is insertable within the front rail (155) of the overhead lift assist system (150). In the illustrated embodiment, the protrusion (161) comprises an opening (173) that is configured to align with an opening (174) on the front rail (155) such that a screw (175) can be inserted through the openings (173, 174) to thereby fasten the front rail (155) with the bracket (162). The bracket (162) further comprises openings (171) on the front portion of the bracket (162) to fasten the bracket (162) with the front rail (13) and the bracket (162) comprises openings (172) on the rear portion of the bracket (162) to fasten the bracket (162) with the side rail (18), such as with U-bolts (159). Of course, any other suitable fastener can be used, such as screws, nails, welds, adhesives, etc.

Figure 9:
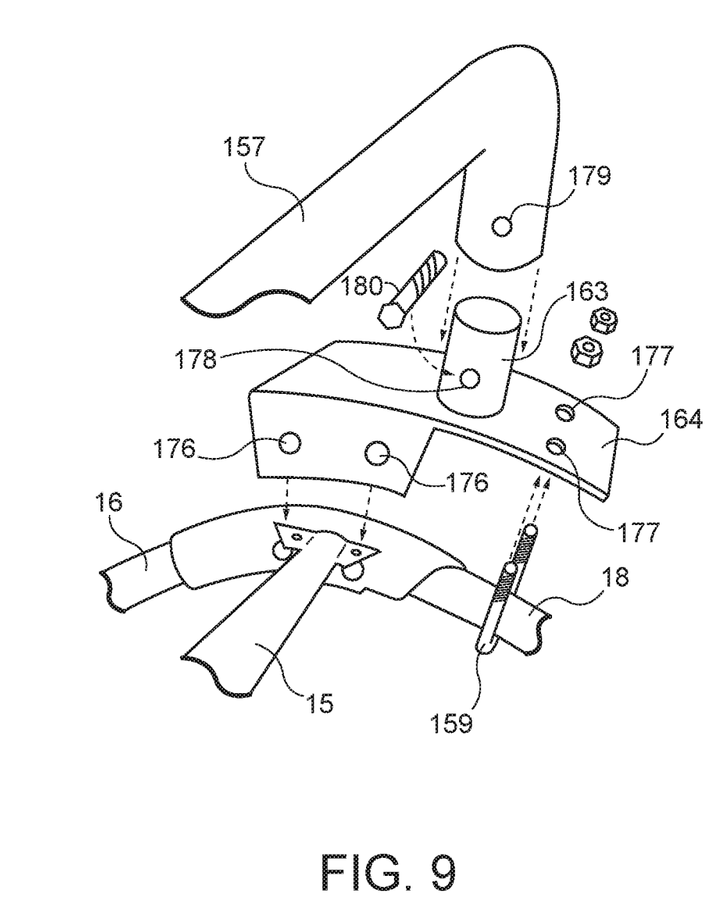
FIG. 9 is an exploded view of a rear bracket of the overhead lift assist system of FIG. 8.

Referring back to FIG. 8, the rear rail (157) of the overhead lift assist system (150) is configured to extend transversely across the UTV (10) substantially perpendicular to the frame (158). The rear rail (157) comprises a support (160) to receive the frame (158) through the support (160). The rear rail (157) is coupled to the top portion of the frame (12) of the UTV (10) at the rear and side rails (15, 18) by brackets (164). Bracket (164) is shown in more detail in FIG. 9. Bracket (164) comprises a curved shape such that a front portion of the bracket (164) overlays side rail (18) and the back portion of the bracket (164) overlays rear rail (16). Bracket (164) further comprises a protrusion (163) extending upward from the bracket (164) such that the protrusion (163) is insertable within the rear rail (157) of the overhead lift assist system (150). In the illustrated embodiment, the protrusion (163) comprises an opening (178) that is configured to align with an opening (179) on the rear rail (157) such that a screw (180) can be inserted through the openings (178, 179) to thereby fasten the rear rail (157) with the bracket (164). The bracket (164) further comprises openings (177) on the front portion of the bracket (164) to fasten the bracket (164) with the side rail (18), such as with U-bolts (159), and the bracket (164) comprises openings (176) on the rear portion of the bracket (164) to fasten the bracket (164) with the rear rail (16). Of course, any other suitable fastener can be used, such as screws, nails, welds, adhesives, etc. Still other configurations for coupling the overhead lift assist system (150) with the frame (12) of the UTV (10) will be apparent to one with ordinary skill in the art in view of the teachings herein.

Figure 11:
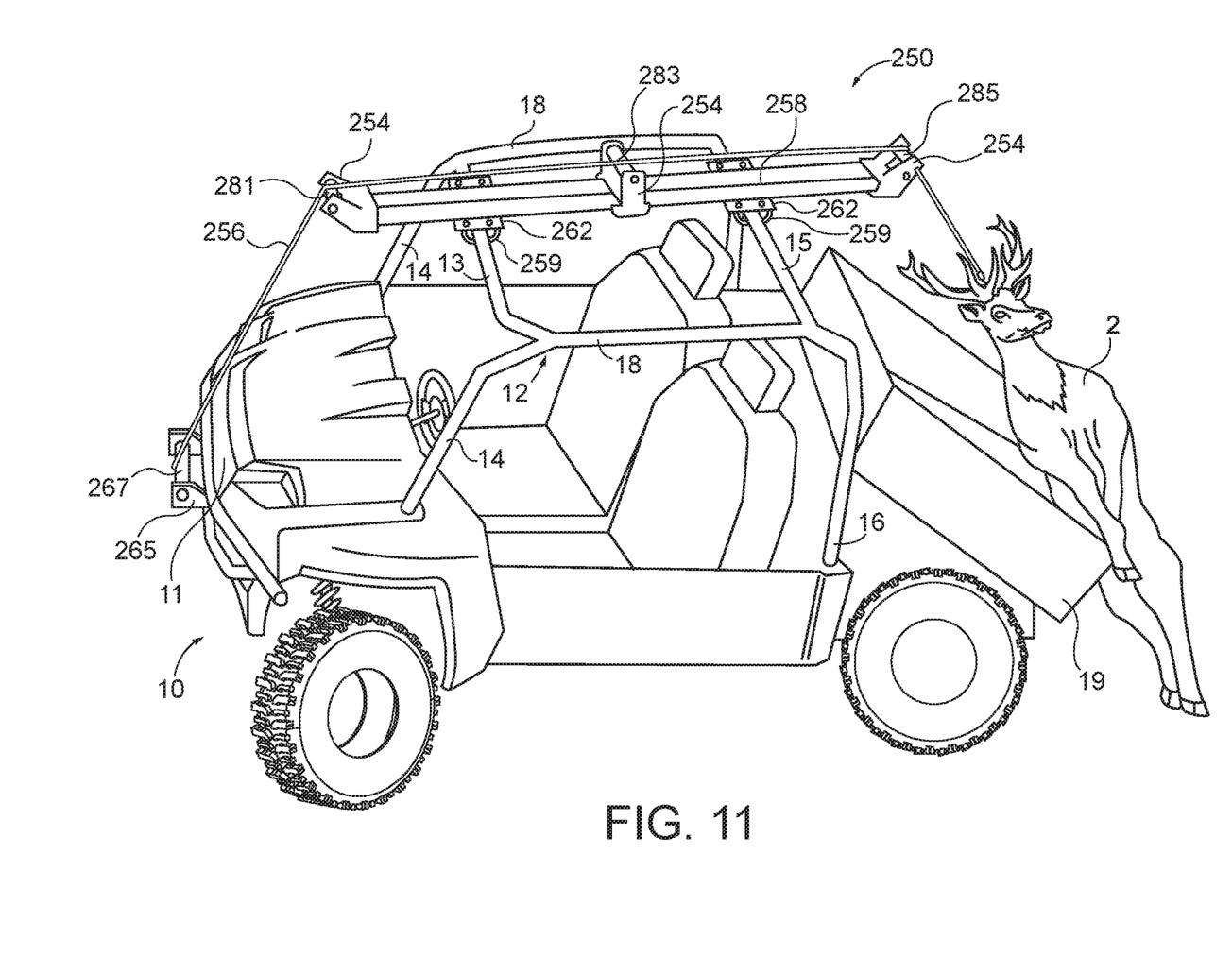
FIG. 11 is a top perspective view of another overhead lift assist system attached to a UTV.

FIG. 11 shows another overhead lift assist system (250) that is similar to overhead lift assist system (150) to couple the overhead lift assist system (250) to a top portion of the frame (12) of the UTV (10). This overhead lift assist system (250) uses plates (262) to couple the overhead lift assist system (250) to the frame (12), instead of brackets (162, 164). In the illustrated embodiment, a plate (262) is secured to the frame (258) where the frame (258) overlays the front rail (13) of the frame (12) and where the frame (258) overlays the rear rail (15). Each plate (262) comprises a plurality of openings to receive a U-bolt (259) on each side of the plate (262) to fasten the plate (262) to the rails (13, 15). Of course, any other suitable fastener can be used, such as screws, nails, welds, adhesives, etc.

Figure 12:
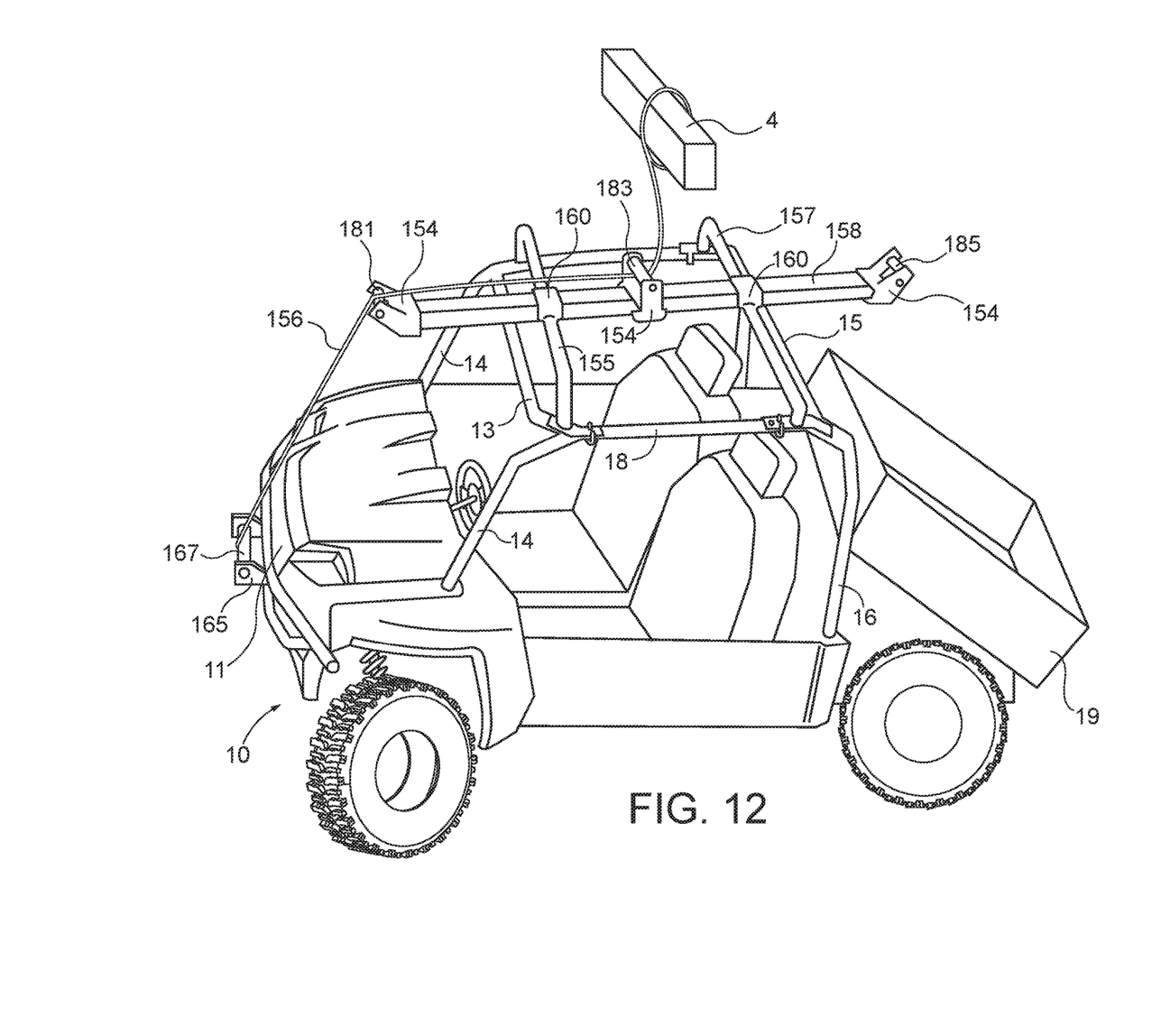
FIG. 12 is a top perspective view of the overhead lift assist system of FIG. 8 coupled to an overhead support structure.
Figure 13:
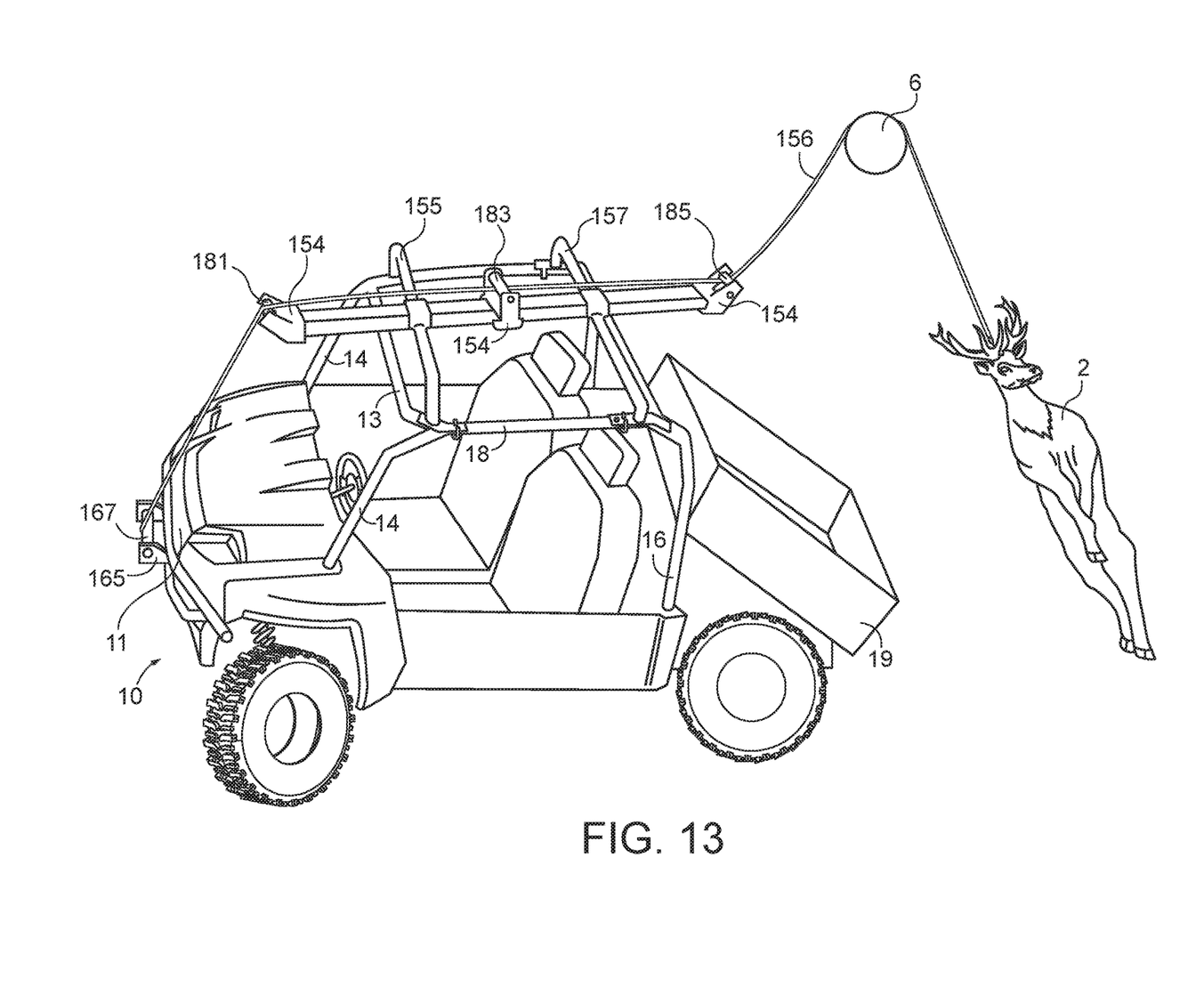
FIG. 13 is a top perspective view of the overhead lift assist system of FIG. 8 being used to hang cargo.

In some instances, it may be desirable to configure the overhead lift assist assemblies (50, 150, 250) to raise the UTV (10) itself, such as for maintenance of the UTV (10). FIG. 12 shows the overhead lift assist assembly (150) configured to raise the UTV (10). As shown, the cable (156) extends from the winch (151) and over the framing roller (167) and the front roller (181). The cable (156) then passes underneath the central roller (183). The other end of the cable (156) is selectively secured to an overhead support structure (4), such as a beam. Accordingly, the winch (151) can be operated as described above to extend and/or retract the cable (156) relative to the winch (151) to thereby raise and/or lower the UTV (10) relative to the support structure (4).

In some instances, it may be desirable to configure the overhead lift assist assemblies (50, 150, 250) to hang the cargo (2) instead of loading it onto the UTV (10). FIG. 12 shows the overhead lift assist assembly (150) configured to hang the cargo (2) such as to allow a deer to cool while hunting. As shown, the cable (156) extends from the winch (151) and over the framing roller (167), the front roller (181), and the central roller (183). The cable (156) then passes underneath the back roller (185). The other end of the cable (156) then passes over a tree branch or other support structure and is selectively secured to the cargo (2). Accordingly, the winch (151) can be operated as described above to extend and/or retract the cable (156) relative to the winch (151) to thereby raise and/or lower the cargo (2) relative to the support structure (2). Still other suitable configurations for the overhead lift assist assemblies (50, 150, 250) will be apparent to one with ordinary skill in the art in view of the teachings herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. An overhead lift assist system for attaching to a utility terrain vehicle to enable cargo to be loaded on the utility terrain vehicle, the overhead lift assist system comprising:
   (a) a frame comprising a rail extending longitudinally above the utility terrain vehicle, wherein a front portion of the rail is coupled to a front portion of a frame of the utility terrain vehicle, wherein a rear portion of the rail is coupled to a rear portion of the frame of the utility terrain vehicle;
   (b) a plurality of rollers coupled to the rail, wherein each roller from the plurality of rollers is disposed along a longitudinal axis of the rail relative to the utility terrain vehicle, wherein at least one roller of the plurality of rollers is disposed above a top portion of a cab of the utility terrain vehicle when the rail is coupled with the utility terrain vehicle; and
   (c) a cable comprising a first end and a second end, wherein the first end of the cable is positioned at a front portion of the utility terrain vehicle, wherein the cable is disposed along the plurality of rollers to the second end terminating in a loading connector, wherein the cable has a length great enough to extend past a rear portion of the utility terrain vehicle, wherein the plurality of rollers comprises a front roller and a back roller positioned longitudinally rearward of the front roller, wherein the cable is strung over the plurality of rollers from the front roller to the back roller, wherein the plurality of rollers further comprises a central roller positioned between the front roller and back roller, wherein the cable is strung over the front roller and underneath the central roller, wherein each of the front, central and rear roller is above the frame.

2. The overhead lift assist system of claim 1, further comprising a winch couplable to a front portion of the utility terrain vehicle, wherein the winch is operable to selectively retract the cable.

3. The overhead lift assist system of claim 2, further comprising a framing roller disposed above the winch.

4. The overhead lift assist system of claim 3, wherein the plurality of rollers comprises a front roller which is closer longitudinally to the framing roller than a top front portion of the cab of the utility terrain vehicle such that the cable strung between the framing roller and the front roller would not contact the utility terrain vehicle between the front roller and the framing roller when the cable is in a taut position.

5. The overhead lift assist system of claim 4, wherein the plurality of rollers comprises a back roller which is farther longitudinally from the framing roller than a top rear portion of the cab of the utility terrain vehicle.

6. The overhead lift assist system of claim 5, wherein the cable extending over the plurality of rollers from the front roller to the back roller would not contact the utility terrain vehicle between the front roller and the back roller when the cable is in a taut position.

7. The overhead lift assist system of claim 1, wherein the frame comprises a tubed rail.

8. The overhead lift assist system of claim 1, wherein the loading connector comprises a hook.

9. The overhead lift assist system of claim 1, wherein the cable is strung over the front roller and underneath the back roller.

10. The overhead lift assist system of claim 1, wherein the frame is coupled to a top portion of a frame of the utility terrain vehicle.

11. The overhead lift assist system of claim 1, wherein the frame is coupled to a side portion of a frame of the utility terrain vehicle.

12. The overhead lift assist system of claim 1, wherein the frame extends beyond a front portion of the utility terrain vehicle and beyond a rear portion of the utility terrain vehicle.

13. The overhead lift assist system of claim 1, wherein the overhead lift assist system is operable by a single person.

14. The overhead lift assist system of claim 1, wherein the overhead lift assist system is operable to raise the cargo into a bed of the utility terrain vehicle, wherein the bed is pivotable to a tilted position relative to the utility terrain vehicle.

15. An overhead lift assist system for loading cargo on a vehicle, the overhead lift assist system comprising: (a) a winch; (b) a frame; (c) a plurality of rollers positioned on the frame, wherein each roller from the plurality of rollers is aligned along a first longitudinal plane and a second lateral plane perpendicular to the first longitudinal plane above the vehicle; and (d) a cable comprising a first end and a second, wherein the first end of the cable is attached to the winch, wherein a second end of the cable terminates in a loading connector, wherein the cable is positioned along the plurality of rollers, wherein the plurality of rollers comprises a front roller and a back roller positioned longitudinally rearward of the front roller, wherein the cable is strung over the plurality of rollers from the front roller to the back roller, wherein the plurality of rollers further comprises a central roller positioned between the front roller and back roller, wherein the cable is strung over the front roller and underneath the central roller, wherein each of the front, central and rear roller is above the frame, wherein the winch is operable to selectively retract the cable.

16. A method for operating an overhead lift assist system to load cargo on a utility terrain vehicle, the overhead lift assist system comprising a frame, comprising a rail extending longitudinally above the utility terrain vehicle, wherein a front portion of the rail is coupled to a front portion of a frame of the utility terrain vehicle, wherein a rear portion of the rail is coupled to a rear portion of the frame of the utility terrain vehicle, a plurality of rollers disposed along the frame, along a longitudinal axis of the rail relative to the utility terrain vehicle, wherein at least one roller of the plurality of rollers is disposed above a top portion of a cab of the utility terrain vehicle when the rail is coupled with the utility terrain vehicle and a cable positioned along the plurality of rollers such that the cable extends from a front portion of the utility terrain vehicle to beyond a rear portion of the utility terrain vehicle, wherein the plurality of rollers comprises a front roller and a back roller positioned longitudinally rearward of the front roller, wherein the cable is strung over the plurality of rollers from the front roller to the back roller, wherein the plurality of rollers further comprises a central roller positioned between the front roller and back roller, wherein the cable is strung over the front roller and underneath the central roller, wherein each of the front roller, central roller and rear roller is above the frame the method comprising the steps of:
   (a) coupling the frame to the utility terrain vehicle such that at least one roller of the plurality of rollers is disposed above a top portion of a cab of the utility terrain vehicle, wherein each roller from the plurality of rollers is disposed along a longitudinal axis relative to the utility terrain vehicle;
   (b) selectively attaching an end of the cable to cargo at the rear portion of the utility terrain vehicle; and (c) retracting the cable to load the cargo onto a pivotable bed of the utility terrain vehicle positioned rearward of each roller of the plurality of rollers such that each roller of the plurality of rollers is in contact with the cable when the cargo is loaded onto the bed.

17. The method of claim 16, further comprising a winch couplable to the front portion of the utility terrain vehicle, wherein the winch is operable to selectively retract the cable.

18. The method of claim 16, wherein the frame is coupled to a top portion of a frame of the utility terrain vehicle.

* * * * *